United States Patent [19]
Zaltron

[11] Patent Number: 5,686,129
[45] Date of Patent: Nov. 11, 1997

[54] CALENDERING APPARATUS AND METHOD FOR ROLLING DOUGH

[76] Inventor: Giampietro Zaltron, Via Da Ponte, 4 - 36100, Vicenza, Italy

[21] Appl. No.: 658,290

[22] Filed: Jun. 5, 1996

Related U.S. Application Data

[63] Continuation of Ser. No. 357,968, Dec. 16, 1994, abandoned.

[30] Foreign Application Priority Data

Dec. 22, 1993 [IT] Italy ................. VR93A0096

[51] Int. Cl.$^6$ ............................ A21D 8/00
[52] U.S. Cl. ............................ 426/502; 426/517
[58] Field of Search .................. 426/496, 502, 426/512, 517; 425/363, 367, 373, 374

[56] References Cited

U.S. PATENT DOCUMENTS

| | | | |
|---|---|---|---|
| 4,015,919 | 4/1977 | Pawelczyk | 425/367 |
| 4,302,478 | 11/1981 | Hamann et al. | 425/367 |
| 4,626,188 | 12/1986 | Morgenthaler et al. | 426/502 |
| 4,631,017 | 12/1986 | Hayashi | 425/367 |
| 4,770,619 | 9/1988 | Rijkaart | 426/502 |
| 4,880,375 | 11/1989 | Hayashi | 425/367 |
| 4,957,426 | 9/1990 | Hayashi | 426/502 |
| 5,059,440 | 10/1991 | Hayashi | 426/502 |
| 5,091,202 | 2/1992 | Hayashi | 426/496 |
| 5,204,123 | 4/1993 | Hayashi | 425/307 |
| 5,268,187 | 12/1993 | Quinlan | 425/367 |
| 5,310,569 | 5/1994 | Muller | 426/502 |

FOREIGN PATENT DOCUMENTS

| | | |
|---|---|---|
| 127583 | 12/1984 | European Pat. Off. . |
| 179645 | 4/1986 | European Pat. Off. . |
| 239154 | 9/1987 | European Pat. Off. . |
| 386988 | 9/1990 | European Pat. Off. . |
| 1290102 | 3/1969 | Germany ............... 426/502 |
| 3411428 | 10/1985 | Germany ............... 426/502 |
| 9101643 | 2/1991 | WIPO . |

*Primary Examiner*—George Yeung
*Attorney, Agent, or Firm*—Guido Modiano; Albert Josif

[57] ABSTRACT

A dough rolling apparatus including a conveyor belt, adapted to feed dough to be rolled or extruded, at least two lower rolling cylinders, which are arranged sequentially and rotate in the opposite direction with respect to the upper cylinder, and a drive unit for each rolling cylinder.

A dough rolling method includes: supporting a sheet of dough on a conveyor belt and feeding the sheet of dough directly into a first space delimited between an upper roller and a lower input roller; rotating the upper roller and the lower input roller as the sheet of dough is fed into the first space and subsequently reducing the thickness of the sheet of dough; subsequently feeding the sheet of dough from the first space directly into a second space defined between the upper roller and a lower output roller; and rotating the upper roller and the lower output roller simultaneously as the sheet of dough is fed into the second space and subsequently further reducing the thickness of the sheet of dough.

1 Claim, 2 Drawing Sheets

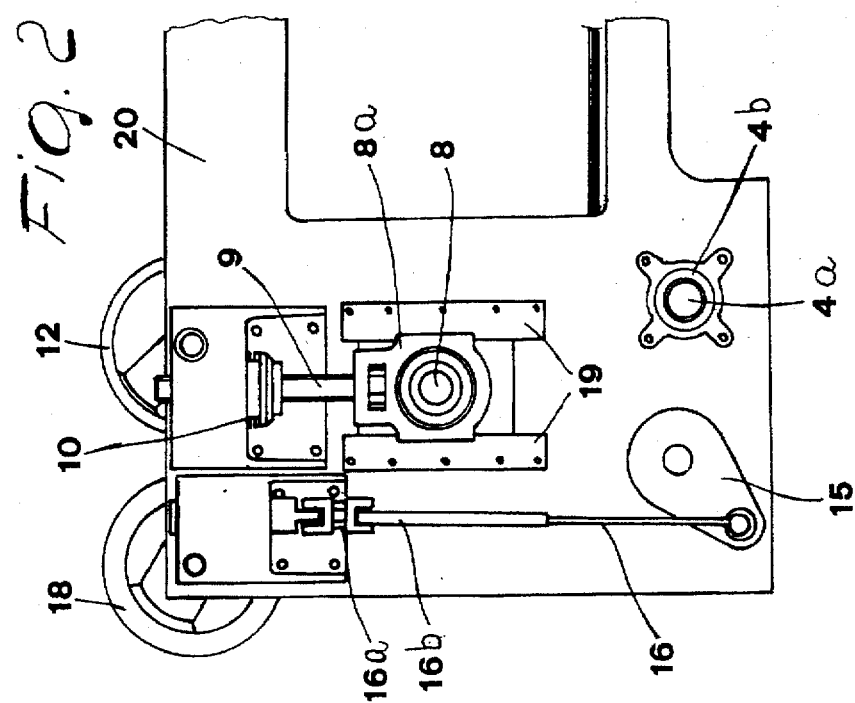
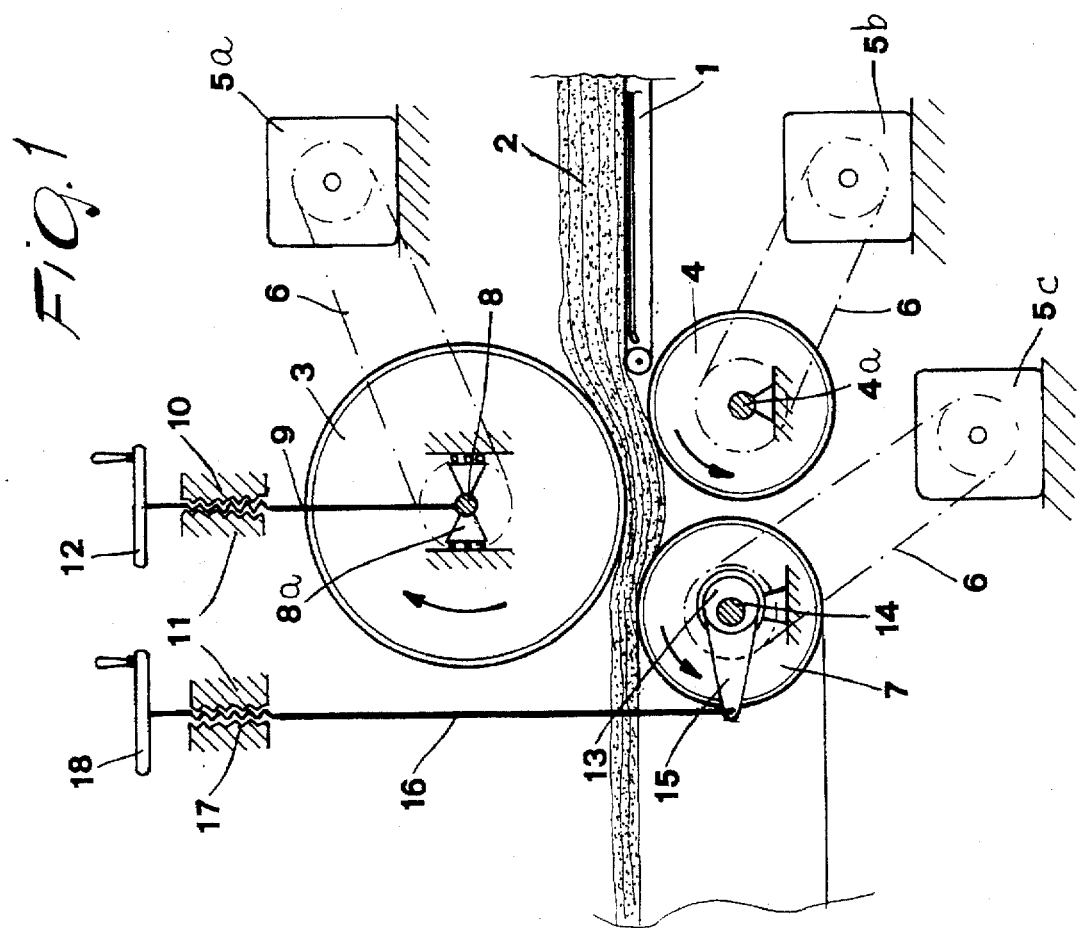

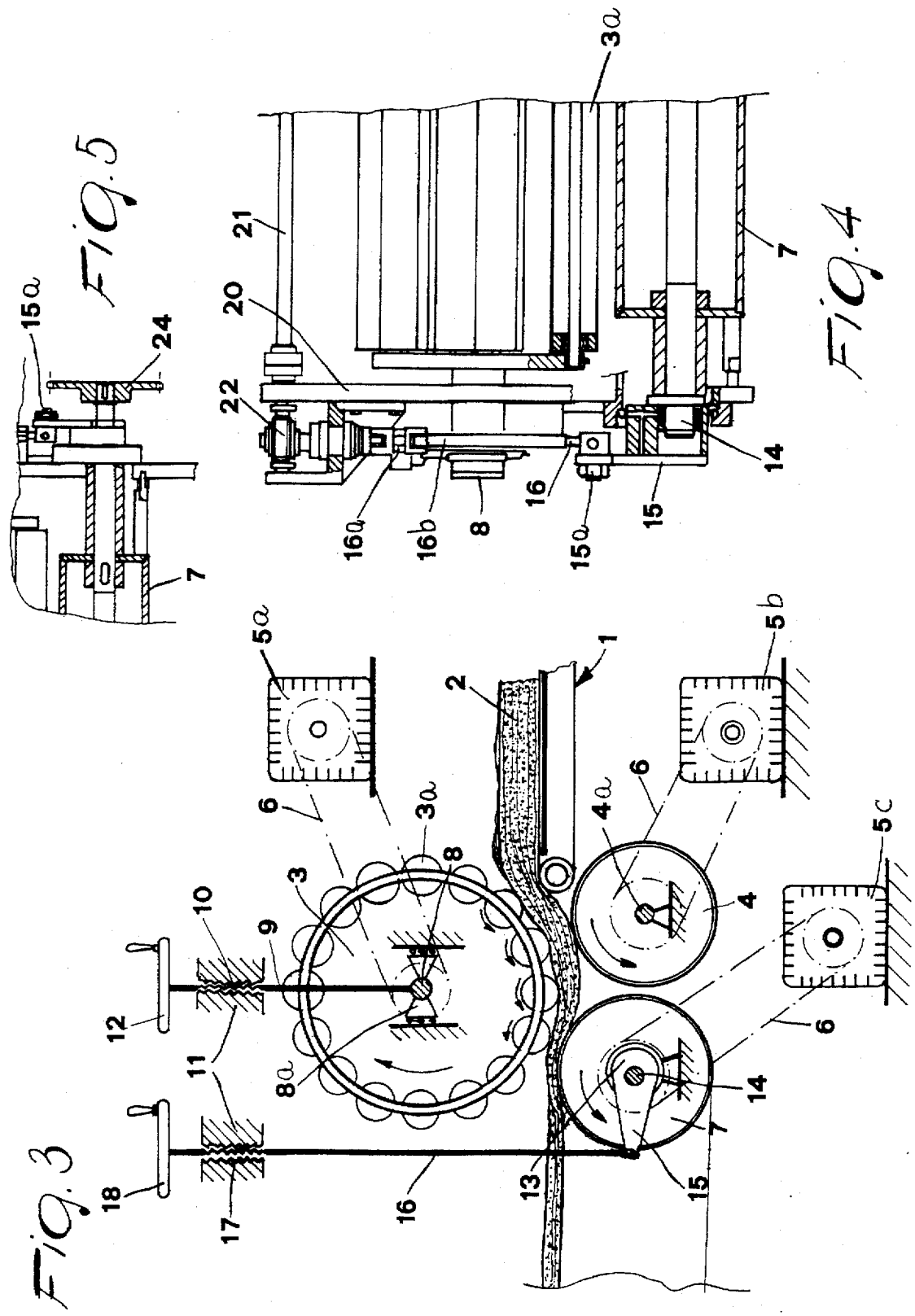

CALENDERING APPARATUS AND METHOD FOR ROLLING DOUGH

This is a continuation of application Ser. No. 08/357,968, filed on Dec. 16, 1994, now abandoned.

BACKGROUND OF THE INVENTION

The present invention relates to an extrusion system and method for extruding or rolling dough, such as dough for bread and leavened doughs for pizzas, croissants, and bakery products in general.

Dough sheets must be rolled without overdoing the thickness reduction process, so as to obtain a layer of uniform thickness to subsequently obtain products that are uniform as to quality and weight and can therefore be packaged easily.

Various rolling systems and extrusion and rolling devices have already been proposed: reference is made, by way of example, to U.S. patent application Ser. No. 08/266,838 filed Jun. 28, 1994, which includes a conveyor belt that carries the dough until it passes through a space which is delimited by two contrarotating cylinders driven by a drive unit by means of a kinematic chain. One of these cylinders can be provided with idle planet rollers which rotate about an axis that belongs to the lateral surface of the bigger cylinder. This kind of solution allows less contact with the dough and at the same time reduces its thickness without causing excessive shearing, until the dough arrives at a conveyor belt which is located at a lower level and downstream of the two cylinders. One or both of the cylinders can be adjusted by shifting their rotation axis to obtain a different gap between them and accordingly different thickness of rolled dough.

The system according to the above mentioned Patent Application and the rolling systems based on planet rollers currently being used are a considerable improvement but are nonetheless subjected in practice to some limitations as regards the quality of the sheet.

It has in fact been observed that the high ratio, for example 10:1, with which the thickness of the dough is reduced produces stresses therein.

SUMMARY OF THE INVENTION

The aim of the present invention is to provide a system for rolling dough that eliminates or substantially reduces the drawbacks described above.

An object of the present invention is to provide a rolling system that allows to increase production capacity and ensures a high degree of final quality of the sheet.

This aim, this object, and others which will become apparent hereinafter are achieved by an extrusion or rolling system for dough which includes a conveyor belt, adapted to feed dough to be rolled or extruded, and an upper rolling cylinder, and is characterized in that it comprises at least two lower rolling cylinders, which rotate in the opposite direction with respect to the upper cylinder, and a drive unit for each rolling cylinder.

Advantageously, the mutual positions of the axes and the respective rotation rates of the upper and lower rolling cylinders can be adjusted independently.

BRIEF DESCRIPTION OF THE DRAWINGS

Further aspects and advantages of the present invention will become apparent from the following detailed description of some embodiments thereof, described only by way of nonlimitative example with reference to the accompanying drawings, wherein:

FIG. 1 is a schematic view, with some parts shown in cross-section, of a first embodiment of a rolling apparatus or system according to the invention;

FIG. 2 is a more detailed side view of a rolling apparatus of FIG. 1;

FIG. 3 is a schematic view, with some parts shown in cross-section, of a further embodiment of a rolling system according to the invention;

FIG. 4 is a partial front view, with some parts shown in cross-section, of a rolling apparatus of FIG. 3; and FIG. 5 is a partial front view, with some parts shown in cross-section, of a detail of FIG. 4.

In the various figures, identical or similar parts or components have been designated by the same reference numerals.

DESCRIPTION OF THE PREFERRED EMBODIMENTS

With reference to FIG. 1, it is evident that a dough rolling system according to the invention comprises a conveyor belt 1 which is adapted to carry a loaf of dough 2 to be rolled towards the space between an upper rolling cylinder 3, a first lower rolling cylinder (or input cylinder) 4, and a second lower rolling cylinder (or output cylinder) 7 which is arranged downstream of the cylinder 4; said rolling cylinders 4 and 7 rotate in the opposite direction with respect to the cylinder 3. There is a respective drive unit, for example electric motors 5a, 5b, and 5c which are connected by means of kinematic transmission chains, for example toothed belts 6, to the rolling cylinders 3, 4, and 7.

The rotation axis 8 of the upper cylinder 3 is guided by a sliding block 8A which can slide along vertical guides and is rigidly coupled to a rod 9 which has a threaded portion 10' that can be screwed into a portion of the frame 11. The rod 9 has an actuation handwheel 12 at the end that lies opposite to the one rigidly coupled to the fulcrum 8.

The rotation axis 14 of the additional lower cylinder 7 is mounted on an eccentric element 13 which can be actuated by a lever 15 that can be operated by means of an articulated vertical rod 16. Said rod 16 has a portion 17 which screws into the frame 11. Said rod 16 has an actuation handwheel at the end that lies opposite to the one connected to the lever 15. This configuration allows to shift the rotation axis 14 of the lower output cylinder 7 in an adjustable manner along a curved path instead of along a straight one, so as to achieve a non-proportional variation in the distance from the cylinders 3 and 4.

FIG. 2 illustrates some constructive details of the apparatus of FIG. 1.

More particularly, the figure shows the handwheels 12 and 18, which transmit their motion by means of the shaft 9 to a pair of sliding blocks 8A that support a respective hub 8 of the cylinder 3. The sliding blocks 8A can slide along vertical guides 19 which are fixed to the framework 20 of the device or apparatus. The transmission shaft 9 has a thread 10 that meshes with a pinion, not shown in the figure, that rotates rigidly with the handwheel 12.

It is also evident that the lever 15 articulated to the rod 16 has a female thread 16b which is connected to the sleeve 16A which, by receiving its rotation from the handwheel 18, screws or unscrews the rod 16, varying its length.

FIG. 2 also shows that a bush 4B supports the rotation axis 4A of the cylinder 4 and is fixed to the framework 20.

In the embodiment of FIG. 3, the upper cylinder 3 comprises multiple idle planet rollers 3A which rotate about an axis that is parallel and coaxial to the axis 8 of the cylinder 3.

FIG. 4 is a front view of a practical embodiment of the system of FIG. 3. It is evident that by virtue of the rotation of an upper adjustment shaft 21, by means of two gears with perpendicular axes 22, the rotary motion is transmitted to a sleeve 16A and then to a female thread 16B which converts it into a translatory motion for the rod 16 which, by acting on a pin 15A, causes the oscillation of the lever 15 and therefore of the rotation axis 14 of the lower cylinder 7.

FIG. 5 illustrates a sprocket 24 which receives its motion from a drive unit 5 by means of a chain 6 to transmit it to the cylinder 7.

The dough 2, fed by the conveyor belt 1, arrives between the upper cylinder 3 and the lower cylinder 4 and undergoes a first extrusion by compression. Both the upper cylinder 3 and the lower cylinder 4 transmit a translatory motion to the dough at a speed which is compatible with the speed of the conveyor belt 1, so as to avoid stretching or compression produced by speed differences.

The space delimited by the two cylinders 3 and 4 is greater than the space between the cylinders 3 and 7. The rotation of the latter cylinder, which has the same direction as the rotation of the cylinder 4, further contributes to the translatory motion of the dough and simultaneously compresses said dough further. In this manner the dough undergoes a compression with gradual extrusion which is not subjected to discontinuities, contractions, and sudden stretching. The dough 2 then tends to partially surround by gravity the lower cylinder 7.

If required, as shown in FIGS. 1 and 3, a conveyor is provided downstream of the output cylinder 7 and directly collects the sheet.

If the upper cylinder 3 has idle planet rollers 3A, one obtains an actual beating of the topmost fibers of the dough, which is thus subjected to a rolling or extrusion that is more gradual, more controlled, and less affected by local pulling actions, as the surfaces in contact are smaller. In order to obtain different sheet thickness according to the characteristics of the dough being treated, it is possible to adjust both the upper cylinder 3, by rotating the handwheel 12, and the cylinder 7, by acting on the handwheel 18 to vary the distance between the cylinder 3 and the cylinder 7. It should be noted that the handwheels 12 and 18 allow to adjust the distances between the cylinders 3 and 7 even while they are working.

The kinematic chains can be constituted by the belts 6 or by other equivalent systems which allow to move the rotation axes of said cylinders. As seen in FIGS. 1 and 3, the distance between the rotation axes 4a and 14 of the rollers 4 and 7 is less than the diameter of the upper roller 3 in each case.

It is evident that a calendering system for rolling dough as described above is highly versatile and can be adapted to the characteristics and requirements of leavened and non-leavened doughs.

From the foregoing description, it is evident that a dough rolling method has been provided, which includes the method steps of: supporting the sheet of dough 2 on a conveyor belt 1 and feeding the sheet of dough directly into the first space delimited between the upper roller 3 and the lower input roller 4; rotating the upper roller 3 and the lower input roller 4 as the sheet of dough 2 is fed into the first space and subsequently reducings the thickness of the sheet of dough 2; subsequently feeding the sheet of dough 2 from the first space directly into the second space defined between the upper roller 3 and the lower output roller 7; and rotating the upper roller 3 and the lower output roller 7 simultaneously as the sheet of dough 2 is fed into the second space and subsequently further reducing the thickness of the sheet of dough 2.

The above described invention is susceptible of numerous modifications and variations within the protective scope defined by the content of the claims that follow.

The materials and the dimensions may be various and according to the requirements.

What is claimed is:

1. A dough rolling method for calendering a sheet of dough, comprising the steps of:

supporting a sheet of dough on a conveyor belt;

feeding the sheet of dough supported on the conveyor belt past an outlet end of the conveyor belt directly into a first space defined between an upper roller and a lower input roller;

rotating the upper roller and the lower input roller simultaneously as the sheet of dough is fed into the first space and subsequently reducing the thickness of the sheet of dough as it passes through said first space with respect to the thickness of the sheet of dough supported on said conveyor belt;

subsequently feeding the sheet of dough from said first space directly into a second space defined between the upper roller and a lower output roller, in which a distance between rotation axes of the lower input and output rollers is less than the nominal diameter of the upper roller, and in which the second space has a minimum distance between the upper roller and the lower output roller which is less than a minimum distance between the upper roller and the lower input roller; and rotating the upper roller and the lower output roller simultaneously as the sheet of dough is fed into the second space and subsequently reducing the thickness of the sheet of dough as it passes through said second space with respect to the thickness of the sheet of dough as it passes through said first space.

* * * * *